(12) United States Patent
Kumar et al.

(10) Patent No.: US 8,510,178 B2
(45) Date of Patent: *Aug. 13, 2013

(54) COMPUTER-BASED ANALYSIS OF SELLER PERFORMANCE

(75) Inventors: Dilip S. Kumar, Seattle, WA (US); David L. Selinger, Seattle, WA (US); Michelle K. Anderson, Seattle, WA (US); Paat Rusmevichientong, Ithaca, NY (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,453

(22) Filed: Jun. 7, 2012

(65) Prior Publication Data

US 2012/0245976 A1 Sep. 27, 2012

Related U.S. Application Data

(60) Continuation of application No. 12/853,207, filed on Aug. 9, 2010, now Pat. No. 8,224,715, which is a division of application No. 10/987,309, filed on Nov. 12, 2004, now Pat. No. 7,797,197.

(51) Int. Cl.
*G06Q 30/00* (2012.01)

(52) U.S. Cl.
USPC ... 705/26.7; 705/14.4; 705/14.43; 705/14.46; 705/26.1

(58) Field of Classification Search
USPC ............... 705/26.1–27.2; 704/26.1–27.2
See application file for complete search history.

(56) References Cited

U.S. PATENT DOCUMENTS

| 5,749,081 | A | 5/1998 | Whiteis |
| 5,991,740 | A | 11/1999 | Messer |
| 6,029,141 | A | 2/2000 | Bezos et al. |
| 6,230,153 | B1 | 5/2001 | Howard et al. |
| 6,266,649 | B1 | 7/2001 | Linden et al. |

(Continued)

FOREIGN PATENT DOCUMENTS

WO 02093304 A2 11/2002

OTHER PUBLICATIONS

"click2learn.com, inc. Announces ONline Learning Partners Program Providing Referral Fee for Site Links" Business/Technology Editors. Online Learning 99. Business Wire. New York; Oct. 19, 1999. p. 1.*

(Continued)

*Primary Examiner* — Michael Misiaszek
(74) *Attorney, Agent, or Firm* — Knobbe, Martens, Olson & Bear, LLP

(57) ABSTRACT

A performance analysis system analyzes the performance of affiliate sites that provide links to specific items in an electronic catalog, and identifies catalog items that can be listed by such affiliate sites to improve performance. An association mining component analyzes transaction data attributable to specific categories of affiliate sites to identify items that are frequently purchased in combination by users of such sites. The detected item associations are used to evaluate, for a given affiliate site, whether significant disparities exist between the expected and actual sales quantities of specific items. The results of the analysis are incorporated into affiliate-specific performance reports, which may include specific recommendations for improving performance. The disclosed methods may also be used to analyze the performance of, and provide recommendations to, online sellers within a marketplace or auction system.

18 Claims, 4 Drawing Sheets

(56) References Cited

U.S. PATENT DOCUMENTS

| | | |
|---|---|---|
| 6,301,575 B1 | 10/2001 | Chadha et al. |
| 6,430,539 B1 | 8/2002 | Lazarus et al. |
| 6,438,579 B1 | 8/2002 | Hosken |
| 6,484,149 B1 | 11/2002 | Jammes et al. |
| 6,718,315 B1 | 4/2004 | Meek et al. |
| 6,754,651 B2 | 6/2004 | Nanavati et al. |
| 6,829,608 B2 | 12/2004 | Ma et al. |
| 6,832,216 B2 | 12/2004 | Shintani et al. |
| 2001/0014868 A1 | 8/2001 | Herz et al. |
| 2002/0083067 A1 | 6/2002 | Tamayo et al. |
| 2002/0174119 A1 | 11/2002 | Kummamuru et al. |
| 2003/0014331 A1 | 1/2003 | Simons |
| 2004/0111319 A1 | 6/2004 | Matsumoto et al. |
| 2005/0182690 A1 | 8/2005 | Martineau et al. |
| 2005/0261990 A1 | 11/2005 | Gocht et al. |
| 2006/0190352 A1 | 8/2006 | Zeidman |

OTHER PUBLICATIONS

Schafer et al., "E-Commerce Recommendation Applications," Data Mining and Knowledge Discovery, vol. 5, Nos. 1-2, Jan. 2001, pp. 115-153.

English Translation of Office Action issued on Feb. 3, 2010, in counterpart Japanese Patent Appl. No. 2007-541249.

English summaries of Japanese language references cited in Office Action issued on Feb. 3, 2010, in counterpart Japanese Patent Appl. No. 2007-541249.

English abstract of Japanese Patent Publication No. 2001-117847, dated Apr. 27, 2001.

English abstract of Japanese Patent Publication No. 2002-288745, dated Apr. 10, 2002.

Linden, G., Smith, B., and York, J., "Amazon.com Recommendations Item-to-Item Collaborative Filtering," Industry Report, published by IEEE Computer Society, IEEE Internet Computing, pp. 76-79. (2003).

Agrawal, R., Imielinski, T., and Swami, A., "Mining Association Rules between Sets of Items in Large Databases," Proceedings of the 1993 ACM SIGMOD International Conference on Management Data, pp. 207-216.

Srikant, R., and Agrawal, R., "Mining Sequential Patterns: Generalizations and Performance Improvements," Proceedings of the 5th International Conference on Extending Database Technology, pp. 3-17 (1996) (ISBN:3-540-61057-X).

Géry, M., and Haddad, H. "Evaluation of Web Usage Mining Approaches for User's Next Request Prediction," ACM WIDM'03, New Orleans, Louisiana, pp. 74-81, Nov. 2003.

M. J. Zaki and C. Hsiao, "CHARM: An efficient algorithm for closed itemset mining," 2nd SIAM Int'l Conference on Data Mining, Apr. 2002.

Zheng, Z., Kohavi R., and Mason L., "Real World Performance of Association Rule Algorithms," Proceedings of the Seventh ACM SIGKDD International Conference on Knowledge Discovery and Data Mining, (2001).

"click2learn.com, inc., Announces Online Learning Partners Program Providing Referral Fee for Site Links" Business/Technology Editors Online Learning 99, Business Wire, New York: Oct. 19, 1999, p. 1.

* cited by examiner

Personalized Recommendations
Affiliate ID: intelihealth123
Date Range: 1/1/04 to 2/1/04

Based on the sales history of your referrals (that is, those products customers bought from us via your affiliate links), we recommend that you provide links to the three products listed below. Each is a product that either you do not merchandise or your customers have bought infrequently.

| Recommendations | Pre-formatted Served Individual Item Link | Similar purchases made by customers you referred |
| --- | --- | --- |
| (Name/ID of 1st item) | (HTML code for adding affiliate link to 1st item) | Item C, Item D |
| (Name/ID of 2nd item) | (HTML code for adding affiliate link to 2nd item) | Item X |
| (Name/ID of 3rd item) | (HTML code for adding affiliate link to 3rd item) | Item D, Item G |

*FIG. 4*

COMPUTER-BASED ANALYSIS OF SELLER PERFORMANCE

PRIORITY CLAIM

This application is a continuation of U.S. application Ser. No. 12/853,207, filed Aug. 9, 2010, now U.S. Pat. No. 8,224,715 which is a division of U.S. application Ser. No. 10/987,309, filed Nov. 12, 2004 (now U.S. Pat. No. 7,797,197), the disclosure of which is hereby incorporated by reference.

BACKGROUND OF THE INVENTION

1. Field of the Invention

The present invention relates to computer-implemented methods for analyzing the performance of an affiliate site, an online seller, or another entity, and for generating recommendations for improving performance.

2. Description of the Related Art

Online merchants commonly set up affiliate programs through which individuals and other business entities ("affiliates") can refer customers in exchange for some form of compensation. Typically, each affiliate operates a web site that includes one or more links to a web site of the online merchant. These links are commonly tagged with an identifier of the affiliate, so that transactions originating from such tagged links can be credited to the appropriate affiliate. Thus, for example, if a user follows a link from an affiliate web site and then makes a purchase from the merchant's web site, the merchant may pay the affiliate a referral fee, such as commission.

Some affiliate programs support the ability for affiliates to list, and to provide links to the merchant's catalog pages for, specific items (products, services, etc.) that are available for purchase from the merchant. For instance, an affiliate web site associated with a particular subject area, such as cooking, may provide tagged links to the item detail pages of selected products associated with that subject area. Each such link may be displayed in conjunction with a description, which may or may not include an explicit recommendation, of the corresponding item. Thus, each affiliate may effectively operate a virtual store that lists specific items for sale, and which relies on an online merchant to process and fulfill orders for items listed in the virtual store. One example of how such a system can be implemented is described in U.S. Pat. No. 6,029,141, the disclosure of which is hereby incorporated by reference.

With affiliate programs that support links to specific items, the success of a given affiliate may depend heavily on the affiliate's ability to select items that are of interest to users of its web site, and to adequately promote these items on the affiliate site. In many cases, however, affiliates do not have the resources or tools needed to ascertain the item preferences of their respective users, or to otherwise evaluate the effectiveness of their web sites. As a result, an affiliate may, for example, fail to list items that are of particular interest to its users, or may fail to display such items in a sufficiently prominent location on the affiliate web site.

SUMMARY OF THE DISCLOSURE

A system and methods for are disclosed for analyzing the performance of affiliate sites, and for identifying items that can be listed on such affiliate sites to improve performance. The system is particularly applicable to affiliate programs in which affiliates are permitted, or required, to select specific items to list on their sites. The system may also be used to analyze the performance of, and provide recommendations to, online sellers within an online mall, an online marketplace, or an online auction system.

In some embodiments, an association mining component programmatically analyzes transaction data associated with specific categories, types or groups of affiliate sites or sellers to identify items that are frequently purchased in combination. The association mining component may, for example generate association rules of the form $X1 \rightarrow X2$ (P), where $X1$ and $X2$ are mutually exclusive sets of items, and P represents the conditional probability that a purchaser of $X1$ will also purchase $X2$. A separate set of association rules may be generated for each category, type, or group of affiliate web sites.

The item associations detected by the association mining component are used to evaluate the performance of specific affiliate sites or sellers, and to identify items that are likely to be of interest to their users or customers. In one embodiment, performance is analyzed by applying the applicable set of association rules to transaction data associated with the affiliate site or seller to calculate expected sales quantities of specific items. These expected item quantities are compared to the corresponding actual item quantities to evaluate whether significant disparities exist.

The results of the performance analysis may be incorporated into a report that is conveyed by email, personalized web page, or other communications method to the corresponding affiliate or seller. This report may include specific recommendations of items to be listed or displayed more prominently by the affiliate or seller. For instance, if a disparity is detected in which the affiliate's expected quantity for a particular item is significantly greater than the actual quantity, the report may suggest adding this item to the affiliate's web site.

In embodiments for analyzing the performance of online sellers, a separate set of association rules may be generated for each of a plurality of categories of online sellers, based on the sales data of the online sellers in the respective category. The performance of each particular online seller may then be evaluated by comparing the actual sales data of the particular online seller to the set of association rules for the corresponding seller category.

Neither this summary nor the following detailed description purports to define the invention. The invention is defined by the claims.

BRIEF DESCRIPTION OF THE DRAWINGS

FIG. 4 illustrates one example of a type of performance report that may be generated by the report generation module of FIG. 1.

DETAILED DESCRIPTION OF SPECIFIC EMBODIMENTS

I. Overview (FIG. 1)

Figure 1:
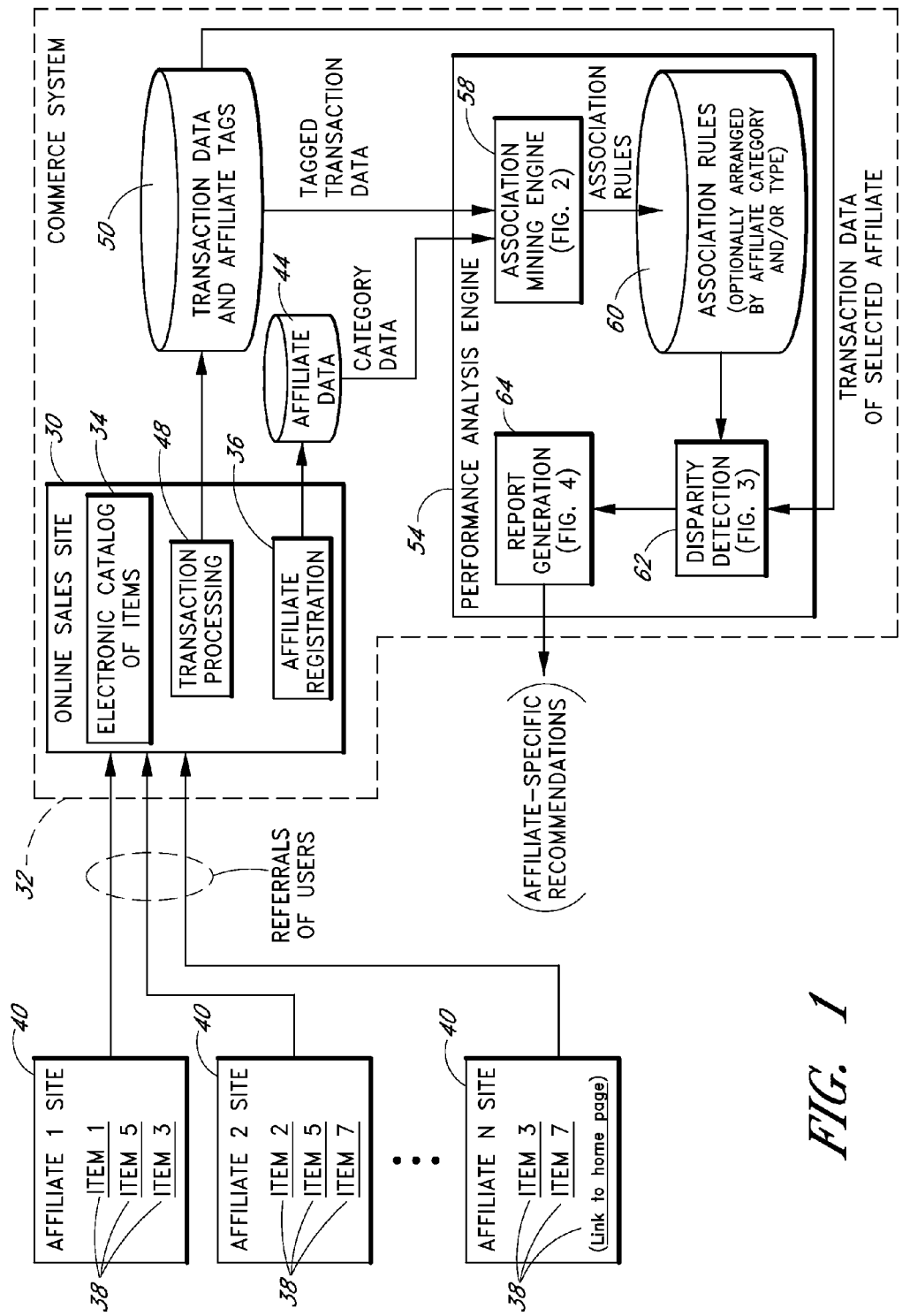
FIG. 1 illustrates the components of a system for analyzing affiliate web site performance, and for providing associated item recommendations to affiliates, in accordance with one embodiment of the invention.

FIG. 1 illustrates the components of a system for analyzing affiliate web site performance, and for generating associated recommendations, in accordance with one embodiment of the invention. The system includes an online sales web site 30 that is part of a commerce system 32. The online sales site 30 provides functionality for users to browse and make purchases from an electronic catalog of items 34.

The items represented in the electronic catalog 34 may, for example, include new and/or used physical products that are shipped to customers, digital products that are transferred electronically to customers, subscriptions, tickets for travel and entertainment events, services, and/or other types of items that can be purchased online. These items may be offered for sale on the online sales site 30 by a single business entity (e.g., a retail merchant) or a collection of business entities. (As used in this detailed description and the claims, the terms "purchase" and "sell," and their derivatives, are not limited to transactions that involve a transfer of ownership of the item being purchased or sold, but rather also encompasses rentals, licenses and leases of items.) Many thousands or millions of different items may be represented in the electronic catalog 34. Each such item may be described in the electronic catalog by a corresponding item detail page that provides functionality for ordering the item.

In the particular embodiment shown in FIG. 1, the commerce system 32 includes components (discussed below) for implementing an affiliate program, and for making "personalized" (affiliate-specific) recommendations regarding catalog items to list on affiliate web sites. As discussed below under the headings EXTERNALLY MANAGED AFFILIATE PROGRAMS and WEB SERVICE IMPLEMENTATIONS, some or all of these components may alternatively be part of a separate site or system, which may be operated by a separate business entity. This may be the case where, for example, the operator of the online sales site 30 partially or wholly out-sources the function of managing the affiliate program to an affiliate program service provider.

In the embodiment shown in FIG. 1, the online sales web site 30 includes an affiliate registration module 36, which may be implemented as a collection of web pages and associated program code. Using this module 36, a web site operator (or an entity planning to set up a web site) can register online to operate as an affiliate of the online sales site 30. As part of the registration process, the affiliate registration module 36 typically assigns a unique affiliate ID to the registrant, and supplies the registrant with instructions for incorporating this ID into links 38 to pages of the online sales site 30. These links 38 are referred to herein as "affiliate links." The online sales web site 30 may also provide a link generation tool that generates HTML, or other coding, for embedding affiliate links 38 within web pages of affiliate sites 40.

During or following the online registration process, each registrant may be prompted to specify one or more categories, or other attributes, that characterize the registrant's existing or proposed web site 40 or business. This may be accomplished by prompting the registrant to select from a list, browse tree, or other collection of predefined categories. Examples of categories include topical categories such as "sporting goods," "electronics," and "tickets," and affiliate site "type" categories such as "comparison shopping" and "online coupons." As discussed below, the affiliates' category selections may be taken into consideration in evaluating the performance of, and generating recommendations for, specific affiliates and affiliate sites 40. For example, the performance of an affiliate web site 40 in the "electronics" category may be compared primarily or exclusively to the performance of other affiliate sites 40 in the same category.

Although input from the affiliates is helpful to categorizing the affiliate sites 40, the affiliate sites may additionally or alternatively be categorized or grouped using other methods. For instance, a program that crawls and analyzes the content of web sites may be used to assign a category identifier to each affiliate or affiliate site 40 based on located keywords and keyword phrases. In addition, a program module may be provided that categorizes the affiliate sites 40 based on the types of items purchased by the users they have referred, and/or based on the types of items to which they provide affiliate links 38.

Information about each affiliate, including information collected during registration, is stored in an affiliates database 44. This information may, for example, include the name, address, affiliate ID, web site URL, affiliate web site category (and/or other site attributes), and bank account information of each affiliate. For a relatively large online sales site 30, many thousands or hundreds of thousands of different registered affiliates may be active at a given time.

Three affiliate web sites 40 are depicted in FIG. 1 for purposes of illustration. In this example, each affiliate web site 40 includes multiple item-specific affiliate links 38 to the electronic catalog 34 of the online sales site 30. Each such item-specific link 38 is typically displayed on the affiliate site 40 in conjunction with a description (not shown) of the corresponding catalog item, and typically points to a corresponding item detail within the catalog 34. Each affiliate can freely select items from the catalog 34 for which to provide affiliate links 38 on its respective site 40, and can change these selections over time. Typically, the set of items selected by a given affiliate will be very small compared to the number of items in the catalog 34.

The affiliates may also be permitted to provide affiliate links 38 that are not specific to, and are not provided in conjunction with a description of, any particular catalog item. For instance, an affiliate web site 40 may include an affiliate link 38 that points to the home page of the online sales web site (as illustrated in FIG. 1), or which points to a page associated with a particular item category or store. Some affiliate sites 40 may only have non-item-specific affiliate links, and no item-specific affiliate links.

Each affiliate link 38, whether specific to a particular catalog item or not, is tagged with the affiliate ID of the corresponding affiliate. Typically, the affiliate ID is included in a predefined tag location within the target URL of the link 38. The presence of the affiliate ID enables the servers of the commerce system 32 to identify and track the source of each referral of a user from an affiliate site 40 to the online sales site 30. This enables the operator of the online sales site 30 to pay the referral fees, such as commissions on resulting sales, to the affiliates that refer users. As discussed below, the tasks of tracking the referrals and paying the referral fees may alternatively be performed by a separate computer system operated by an affiliate program service provider.

A user may, but need not, initiate browsing of the electronic catalog 34 by selecting a link 38 on an affiliate site. If a user selects an affiliate link 38 and then makes a purchase from the online sales site 30, the sale may be credited or attributed to the corresponding affiliate, in which case the affiliate may be paid a commission that is based on the sales price. When the purchase of an item is attributed to a particular affiliate, the affiliate is commonly referred to as having "sold" the item, even though the sale is actually transacted by the online sales site 30.

The rules for attributing sales to affiliates vary from program to program. As one example, the affiliate may be given credit for all purchases made by the referred user within a particular time period (e.g., twenty-four hours) following the user's selection of the affiliate link 38, excluding any such purchases made after the user re-enters the online sales site 30 from a site of a different affiliate. As another example, the affiliate may only be given credit if the item purchased is the same as the item selected by the user while browsing the affiliate's site 40. As will be apparent, the present invention is not limited to any particular rule or set of rules for attributing sales to affiliates.

In the embodiment shown in FIG. 1, the rules for attributing sales transactions to affiliates are embodied within a transaction processing engine 48 that handles the online checkout process. Each time a user purchases an item via the online sales site 30, the transaction processing engine 48 records the purchase in a transactions database 50. If a given item purchase is to be attributed to a particular affiliate, the item purchase event is tagged in the database 50 with the corresponding affiliate ID. An executable component (not shown) uses the affiliate ID tags and associated transaction data recorded in the database 50 to calculate commissions or other referral fees to be paid to specific affiliates.

As shown in FIG. 1, a performance analysis engine 54 analyzes the tagged transaction data collected in the transactions database 50 to evaluate the performance of, and to make recommendations for, specific affiliates and affiliate sites 40. As shown in FIG. 1, the performance analysis engine 54 may take into consideration the categories or attributes of the affiliate web sites 40 as part of this analysis. For example, the recommendations generated for a particular affiliate web site 40 falling within a given category may be based solely on transactions attributable to affiliate sites falling within that category. The performance analysis engine 54 may additionally or alternatively generate recommendations that are based on a broader analysis of the transaction data, such as an analysis that takes into consideration all transactions tagged with affiliate IDs.

Figure 2:
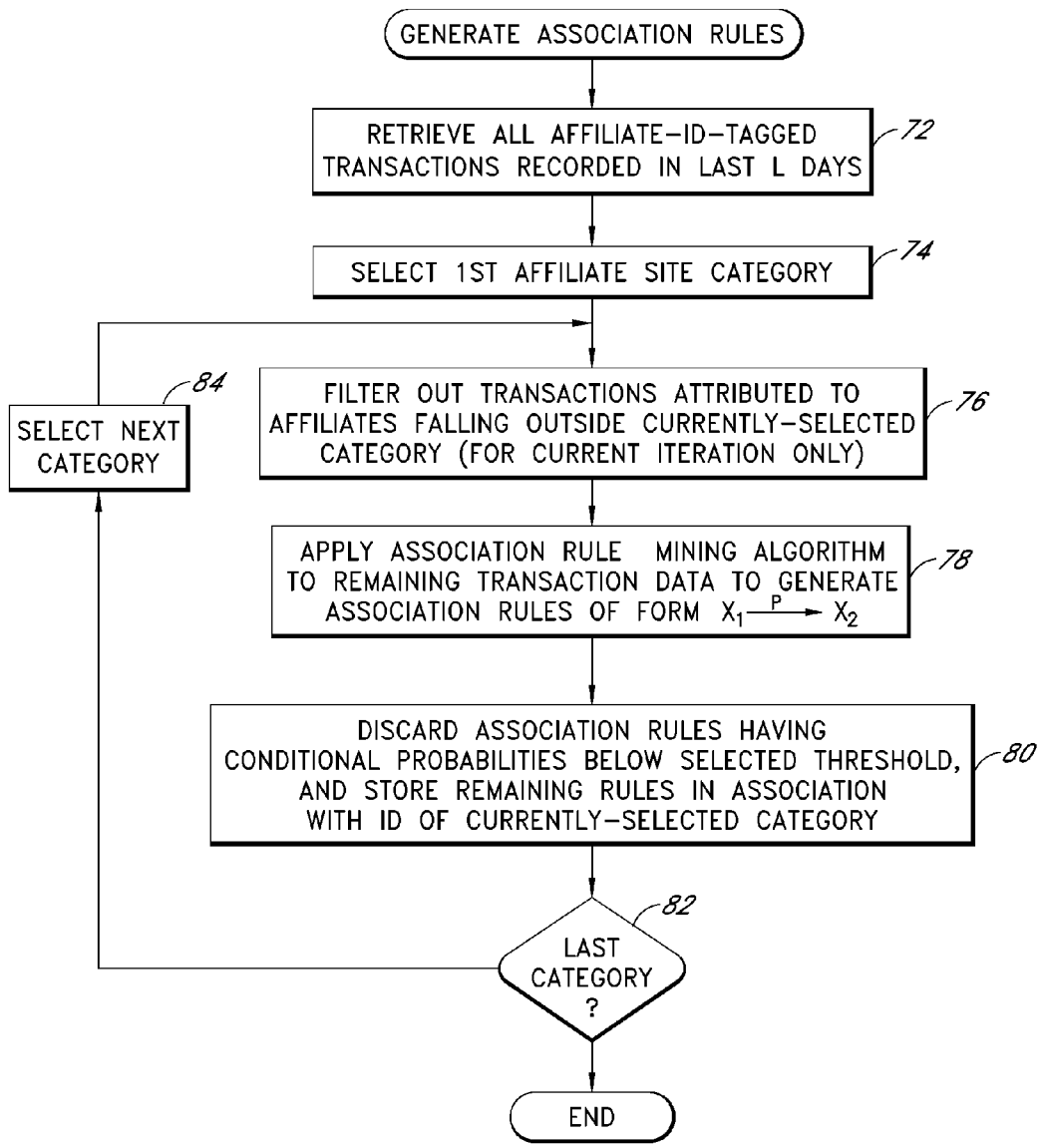
FIG. 2 illustrates a sequence of steps that may be performed by the association mining engine of FIG. 1 to generate association rules.

In the embodiment depicted in FIG. 1, the performance analysis engine 54 includes four components: an association mining engine 58, and database or other repository 60 of association rules, a disparity detection module 62, and a report generation module 64. The association mining engine 58 periodically analyzes transaction data collected over a period of time, such as the last six weeks or months, to generate a set of association rules that identify items that tend to be purchased in combination. Each association rule may be represented by the expression X1→X2 (P), where X1 and X2 are mutually exclusive sets of items in the catalog 34, and P represents the conditional probability that a purchaser of X1 will also purchase X2. For instance, the association rule {item 1, item 5}→item 3 (65%) indicates that sixty five percent of the users who purchase items 1 and 5 also purchase item 3. Typically, X1 will have a size of one, two or three, and X2 will have a size of one. An example sequence of steps that may be performed by the association mining engine 58 to generate the association rules is shown in FIG. 2, which is discussed separately below.

In one embodiment, the association mining engine 58 generates a separate set of association rules for each affiliate web site category—or at least those categories that include a sufficient number of active sites 40 to generate meaningful rules. The association mining engine 58 may additionally or alternatively generate association rules that are specific to a particular affiliate attribute or set of attributes. For instance, a set of association rules may be generated for all affiliates whose transaction volume exceeds a particular threshold, or for all affiliates whose web sites 40 contain a particular keyword or combination of keywords. The association mining engine 58 may additionally or alternatively generate associate rules that are not specific to any particular subset of affiliates.

Although association rules are used in the illustrated embodiment, the item associations detected by the association mining engine 58 may be represented in a format that does not include association rules. For example, the association mining engine 58 may record the detected associations in a format in which the conditional probability values are omitted. Thus, the association rules referred to throughout this description may be replaced with other forms of item association data.

In the illustrated embodiment, the association rules generated by the association mining engine 58 are stored in a database 60 in association with the affiliate site categories or groupings to which they correspond. This database 60 is updated over time (e.g., once per month) to reflect new transactions recorded in the transactions database 50.

The disparity detection module 62 uses the association rules stored in the database 60 to separately analyze the performance of each affiliate/affiliate site 40, and to identify significant performance disparities to call to the attention of the affiliate. As part of this process, the applicable association rules may be used to detect significant disparities between expected and actual sales quantities of particular items.

For instance, suppose the association rule {item A, item D}→{item F} (50%) has been generated for a particular category of affiliate sites. Suppose further that a particular affiliate in this category has, during the past month, sold items A and D to two hundred different users, but has only sold item F to three users. In this example, a significant disparity exists between the affiliate's expected sales quantity of 0.5×200=100 units of item F, and the actual quantity of three. This disparity may be attributable to the absence, or the poor placement, of item F on the affiliate's web site 40. Thus, if item F is recommended to this affiliate, or if the affiliate is notified of this disparity, the affiliate can appropriately modify its web site 40 to significantly improve its performance in connection with item F.

Figure 3:
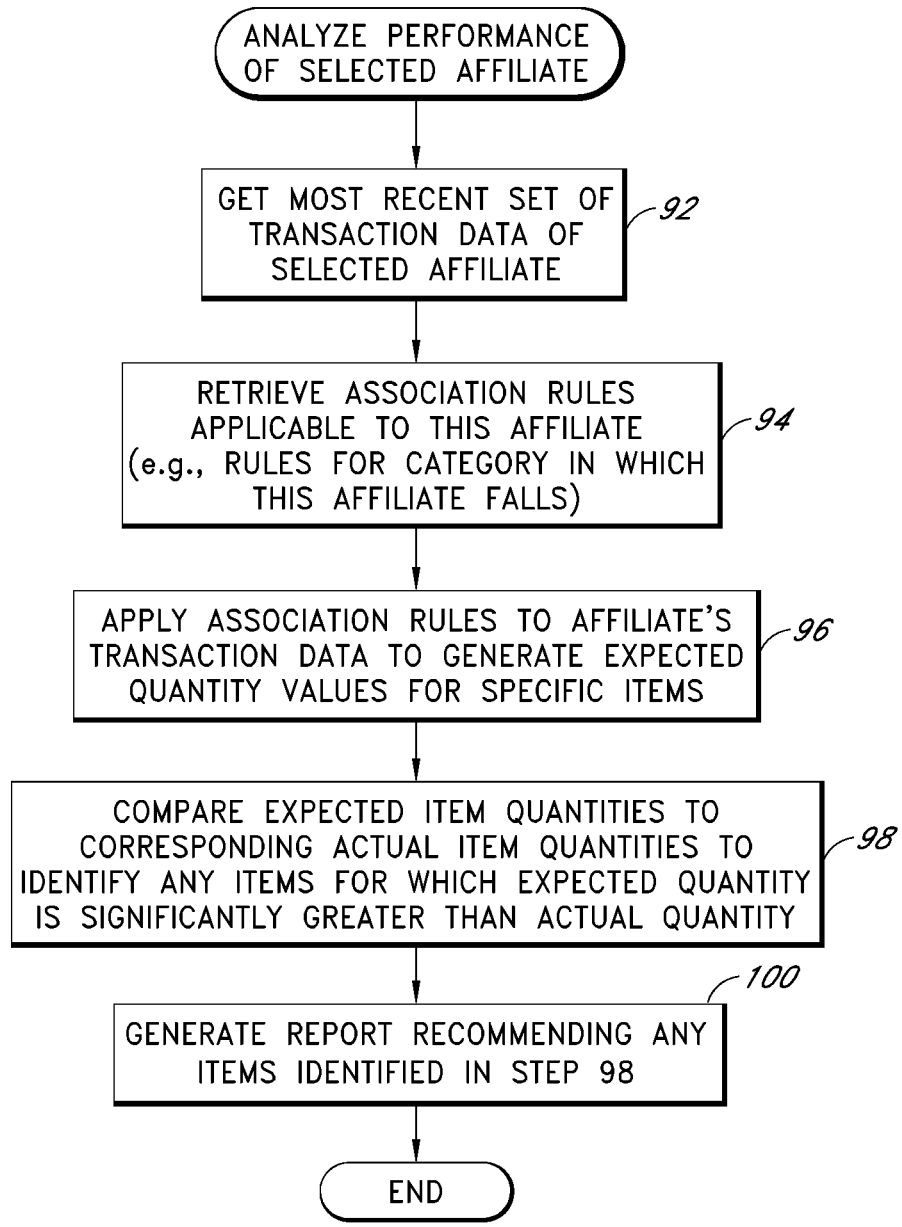
FIG. 3 illustrates a sequence of steps that may be performed by the disparity detection module of FIG. 1 to analyze the performance of a specific affiliate site.

An example sequence of steps that may be performed by the disparity detection module 62 is depicted in FIG. 3, and is discussed separately below.

As further depicted in FIG. 1, significant disparities detected by the disparity detection module 62 are incorporated into affiliate-specific performance reports generated by a report generation module 64. The performance reports may include recommendations of specific items that can be added to the affiliate site 40 to improve performance. One example of such a report is shown in FIG. 4, which is discussed below. The reports may be conveyed to the corresponding affiliates as email messages, as personalized web pages, by facsimile, and/or using any other communications method.

In one embodiment, the performance analysis engine 54 is accessible via an affiliate extranet that can be securely accessed by affiliates to interactively generate performance reports. The extranet may provide functionality for an affiliate to interactively select an affiliate site category, and to then view a performance report showing how its site 40 is performing within that category. The extranet may also provide functionality for the affiliate to interactively specifying a date range over which to analyze the performance of the affiliate site 40.

II. Generation of Association Rules (FIG. 2)

FIG. 2 illustrates one example of process (sequence of steps) that may be executed by the association mining engine 58 to generate sets of association rules for each predefined affiliate site category. This process may be repeated periodically, such as once per month, to generate a new set of rules for each category.

In step 72 of FIG. 2, all transactions that occurred in the last L days and are tagged with an affiliate ID are retrieved from the transactions database 50. The variable L represents a look-back horizon, in days, for analyzing the transaction data. In step 74, the first category of affiliate web sites is selected. In step 76, all transactions attributable to affiliate sites 40 falling outside the currently selected category are filtered out for purposes of the current iteration of the process. The category of a given affiliate site 40 may, for example, be determined based on any one or more of the following: (a) category information supplied by the affiliate during or following registration; (b) the item categories of items purchased by users referred by the affiliate site; (c) the item categories associated with the catalog pages to which users are referred by the affiliate site; (d) the results of a content-based analysis performed by a program that crawls and analyzes the content of affiliate sites; (e) category assignments made by a human operator who reviews the affiliate sites; (f) any other type of site information that is accessible to the association mining engine 58.

In step 78, an association-rule mining algorithm is applied to the remaining transaction data (i.e., to the transactions not filtered out in the current iteration) to generate an initial set of association rules for the currently-selected category. Any of a variety of well known association-rule mining algorithms may be used for this purpose. One algorithm that is well suited for large domains of items is the CHARM algorithm, which is described in M. J. Zaki and C. Hsiao, "CHARM: An efficient algorithm for closed itemset mining," 2nd SIAM Int'l Conf. on Data Mining, April, 2002, the disclosure of which is hereby incorporated by reference. Other algorithms that may be used include Eclat and Apriori. In step 80, the association rules having conditional probability or "confidence" values falling below a particular threshold, such as 0.3 (or 30%), are discarded, and the remaining association rules are stored in the database 60 in association with the currently selected category.

The association rules generated in step 78 typically include rules that map two-item sets to single-item sets. The association rule {item 2, item 4}→item 1 (65%) is one example of a rule that represents such a 2-to-1 mapping. Rules that represent 1-to-1 mappings, 3-to-1 mappings, 1-to-2 mappings, and 2-to-2 mappings may also be generated and used.

As depicted by blocks 82 and 84 of FIG. 2, steps 76-80 are repeated for each category of affiliate web site 40 until association rules have been generated for all categories. In addition or as an alternative to generating category-specific association rules, a set of general association rules may be generated based on all of the transaction data retrieved in step 72. One benefit to generating association rules that are specific to a particular category or type of affiliate site 40, as opposed to generating a general set of association rules, is that the total processing burden is significantly reduced. This is because the set of items purchased by all users referred by a particular category or type of affiliate tends to be much smaller than the set of items purchased by all users referred by affiliate sites.

One attribute of the process shown in FIG. 2 is that the association rules generated for a particular site category are based solely on purchases attributable to affiliate sites in that category. As a result, the rules strongly reflect the preferences of users who browse that particular category of affiliate site. One variation to the process shown in FIG. 2 is to also take into consideration other purchases made by these same users. Specifically, the association rules for category D may be based on the purchases made by all users referred by category D affiliate sites 40, including but not limited to purchases that are actually attributed to an affiliate site in category D. One possible benefit of this variation is that a greater quantity of transaction data may be used to generate the association rules; one potential consideration is that the rules may fail to reflect users' preferences to select certain types of items from affiliate sites, and to select other types of items directly from the online sales site 30.

As mentioned above, although association rules are generated and used in the illustrated embodiment, other forms of association data may alternatively be used.

III. Application of Association Rules to Detect Disparities (FIG. 3)

FIG. 3 illustrates a process that may be executed by the disparity detection module 62 to evaluate the performance of a particular affiliate site 40. This process may be executed periodically (e.g., once per month) for each active affiliate site, and/or may be invoked when an affiliate logs in and initiates generation of a performance report.

In step 92, the transactions database 50 is accessed to retrieve transaction data describing all item purchases made within the last M days (e.g., 30 days) that are attributed to this affiliate. In some cases, a given affiliate may operate multiple web sites using the same affiliate ID. In these cases, the transaction data retrieved in step 92, and analyzed in the subsequent steps, will reflect the user referrals from all such web sites 40. Stated differently, the affiliate site 40 whose performance is analyzed in this situation may be thought of as including all web pages that include affiliate links 38 tagged with the same affiliate ID, even though some of these pages may be hosted by servers in different Internet domains than others.

In step 94, the association rules that are applicable to this affiliate are retrieved from the association rules database 60. If this affiliate site 40 is assigned to a particular category of affiliate sites, the association rules retrieved in this step 94 may be the current set of association rules for this category. Otherwise, a generic set of association rules that are applicable to all affiliate sites may be retrieved and used. One benefit to using category-specific association rules is that the rules tend to be much more applicable to, and reflective of the user preferences of, the affiliate web sites 50 to which they are applied.

In step 96, the retrieved association rules are applied to the transaction data retrieved in step 92 to generate expected quantity values for specific items. In step 98, these expected quantity values are compared to the corresponding actual quantity values to determine whether any significant disparities exist. A disparity may be treated as significant if, for example, an item's expected quantity exceeds its actual quantity by a certain number (e.g., fifty). The ratio between the expected and actual values may also be taken into consideration in determining whether the disparity is significant.

The following example illustrates how significant disparities may be detected in steps 96 and 98. For purposes of this example, assume that the following two association rules are applicable to the current affiliate:

Rule 1: {item B, item D}→item A (95%)
Rule 2: {item A, item E}→item F (50%)

In addition, assume the following sales activity has been attributed to this affiliate during the relevant time period:

800 sales of {item B, item D}
30 sales of {item A, item E}

30 sales of item A 10 sales of item F

Applying rule 1 to this activity data produces an expected quantity of 0.95×800=760 units of item A. Because this expected quantity greatly exceeds the actual quantity of sixty, the disparity between the two may be treated as significant, and may be used as a basis for recommending that item A be listed, or displayed more prominently, by this affiliate. It should be noted in this example that although the affiliate has sold sixty units of item A, item A may not actually be listed on the affiliate's web site 40; this is because a sale of item A may be attributed to the affiliate even though the purchaser entered the online sales site 30 by selecting a different item, or by selecting a non-item-specific link, on the affiliate's site. As mentioned above, some affiliate programs may not attribute this type of sale to the affiliate.

Continuing this example, application of rule 2 to the affiliate's activity data produces an expected quantity of 0.50× 30=15 units of item F. Because this value does not significantly exceed the actual quantity of ten, the affiliate's sales of item F may be treated as generally consistent with expectations. Hence, rule 2 would not be used as a basis for recommending item F to this affiliate.

As will be recognized, a variety of other performance metrics may be used to evaluate the performance of each affiliate site 40. For example, an affiliate's performance with a respect to a given catalog item may additionally or alternatively be assessed based on (a) the amount of revenue generated by this affiliate in comparison to other affiliates in the same category, and/or (b) the number of users referred to the item's detail page by this affiliate in comparison to other affiliates in the same category. Regardless of the particular performance metric used, the affiliate's actual performance with respect to a particular item may be compared against the expected performance, where the expected performance takes into consideration both (a) this affiliate's performance with respect to other items, and (b) the performance of other affiliates, such as those falling in the same category.

As depicted in block 100, any significant disparities that are detected are reported to the report generation module 64 (FIG. 1), and are incorporated into a performance report that is transmitted to the affiliate. For each recommended item, the report generation module 64 may generate, and incorporate into the report, a sequence of HTML or other coding for adding an affiliate link that points to the item in the electronic catalog 34 (see example report in FIG. 4). This link coding, which includes the affiliate's unique ID, may be copied by the affiliate into an associated HTML document to add the affiliate link to the affiliate site 40.

IV. Example Performance Report (FIG. 4)

FIG. 4 illustrates one example of a report format that may be used to provide recommendations to the affiliates. In this example, the report recommends three specific products to the affiliate, and contains HTML coding for augmenting its affiliate site by adding links to these products. The report also includes a general explanation of why these three products are being recommended. A more detailed explanation that specifies, for example, the affiliate's actual and expected sales quantities of these products may alternatively be used. Further, rather than providing explicit recommendations, the performance report could display the raw data, and let the affiliate decide whether the disparities between expected and actual sales quantities are sufficiently significant to justify changes to its web site 40.

As mentioned above, personalized reports of the type shown in FIG. 4 may be generated automatically (e.g., once per month) and transmitted to the affiliates by email or other communications method. In addition, an extranet or other interactive system may be provided through which affiliates can interactively request and view specific reports.

V. Hardware and Software Components

The components of the performance analysis engine 54 shown in FIG. 1, including the association mining engine 58, the disparity detection module 62, and the report generation module 64, may be implemented within program modules executed by one or more general purpose computers. The functions performed by these components 58, 62, 64 may be integrated into a common computer program, or may be implemented in separate computer programs (which may or may not run on the same computer). The databases 44, 50, 60 shown in FIG. 1 may be any type of electronic repository used to store data, and may be combined with each other and/or with other databases.

The online sales web site 30 may be implemented with server software executed by one or more general purpose computers, which may or may not be the same computers used to implement the performance analysis engine 54. The web pages of the site 30 may be encoded using HTML (Hypertext Markup Language) and/or another markup language. Each affiliate web site 40 may be implemented by any type of computer system capable of serving web pages in response to HTTP requests. A given affiliate site may consist of a single web page (e.g., a personal page of an individual user) or a collection of web pages.

Users may browse the online sales site 30 and the affiliate sites 40 using any type of computing device that provides web browsing capabilities (personal computers, PDAs, cell phones, etc.). Typically, each such computing device runs browser software capable of generating HTTP requests.

The computers used to implement the commerce system 32 may be interconnected by one or more computer networks, and may, but need not, reside locally to each other. The computers that host the affiliate sites 40 typically reside remotely from those of the commerce system 32.

VI. Content-Based Recommendations

In the embodiments described above, the performance of a given affiliate or affiliate site 40 is evaluated based on the transaction data associated with that affiliate or affiliate site. Another approach that may additionally or alternatively be used is to programmatically crawl and analyze the content of the affiliate site 40 to identify the items that are currently listed. Once this set of items is known, recommendations may be provided of other items that are frequently purchased by those who purchase one or more of the listed items. Item association data (e.g., a set of association rules) that is specific to the corresponding affiliate category may be used for this purpose.

As part of the programmatic analysis of site content, the degrees to which specific items are separated from each other on the affiliate site 40 may be detected and analyzed. For example, if a strong association exists between items A and B, but the two items are separated by more than a threshold "distance" on the affiliate site 40 (e.g., by more than one click, or by more than a threshold number of intervening items on a page on which both items are listed), the performance report may suggest listing these items in closer proximity.

VII. Externally Managed Affiliate Programs

Many existing affiliate programs are partially or wholly managed by a third party affiliate program service provider, such as Commission Junction or ValueClick. With these "externally managed" programs, each affiliate link 38 to the online sales site 30 may be an indirect link that actually points to a separate computer system or site operated by the service provider. When a user selects such a link 38, the service provider site may record the referral event and transparently redirect the user's browser to the online sales web site 30. The service provider site may also use the recorded referral information, in combination with transaction data reported back by the online sales site 30, to calculate referral fees to be paid to the various affiliates.

With this type of implementation, the performance analysis engine 54 (FIG. 1) may be implemented as part of the service provider site, rather than as part of the commerce system 30. In this type of embodiment, a single performance analysis engine 54 may provide performance reports to the affiliates of many different affiliate programs of many different online sales sites 30. The system implementation may otherwise be generally the same as shown in FIG. 1 and described above.

VIII. Web Service Implementations

The performance analysis engine 54 may also be implemented as a web service that can be called over the Internet by other computer systems. With this approach, a commerce system 32 that implements its own affiliates program can periodically pass sets of transaction data to the web service, which may use this data to generate and return performance reports of the type described above. The performance reports may then be delivered to the corresponding affiliates. Affiliate program service providers may also use the web service to obtain performance reports to send to affiliates.

IX. Recommendations for Other Types of Online Sellers

The system and methods described above can also be used to evaluate the performance of, and provide recommendations to, online sellers that actually sell items. The online sellers may, for example, include merchants that have their own web sites or storefronts within an online mall, and/or may include small business entities that sell items in an online marketplace or on an online auction site.

As in the affiliate-based embodiments described above, the online sellers may initially be grouped into categories. This may be accomplished using one or more of the following: (a) seller-supplied category data, (b) transaction data associated with each online seller, (c) catalog or listing content provided by each online seller. Once the online sellers have been assigned to specific seller categories, the general process shown in FIG. 2 may be used to generate a separate set of item association rules for each such category. For example, to generate a set of association rules for the category "sellers of cooking supplies," the aggregated sales data of all online sellers within this category may be analyzed using the CHARM algorithm or another association-rule mining algorithm.

Finally, the process shown in FIG. 3 may be used to evaluate the performance of, and generate seller-specific performance reports for, particular online sellers. For instance, to evaluate the performance of a particular online seller in the cooking supplies category, the association rules for this category may be applied to the actual sales data of this particular seller to identify disparities between actual and expected performance. The results of this analysis, which may include recommendations of additional items to sell, may then be transmitted to the online seller.

X. Conclusion

The systems and methods described herein may also be used to make other types of recommendations to affiliates. For instance, the performance analysis engine 58 may additionally or alternatively recommend categories or types of items to list on the affiliate site 40. In addition, for affiliate programs in which affiliates can select advertisements, such as banner ads, to host on their respective sites 40, the performance analysis engine 58 may identify and recommend specific ads to host on a particular affiliate site to improve its performance.

Although this invention has been described in terms of certain embodiments and applications, other embodiments and applications that are apparent to those of ordinary skill in the art, including embodiments that do not provide all of the features and advantages set forth herein, are also within the scope of this invention. Accordingly, the scope of the present invention is defined only by the appended claims.

What is claimed is:

1. A method of analyzing the performance of sellers, the method comprising:
   collecting transaction data of a plurality of sellers that sell items online in a seller category, said transaction data identifying specific items sold by the sellers to buyers;
   generating, based on the transaction data of the plurality of sellers, item association data that identifies items that are purchased in combination relatively frequently by the buyers, said item association data not being specific to any particular seller;
   analyzing performance of a particular seller by comparing the item association data to transaction data associated with the particular seller; and
   generating for the particular seller, based on results of the analysis of performance, an electronic report that includes a recommendation of at least one item for the particular seller to sell to improve performance;
   said method performed in its entirety by a computer system that comprises one or more computers.

2. The method of claim 1, wherein analyzing the performance of the particular seller comprises detecting disparities between expected and actual sales quantities of specific items.

3. The method of claim 2, wherein generating the electronic report comprises using said disparities to generate recommendations of items for the particular seller to sell.

4. The method of claim 1, wherein said item is an item that is not currently sold by the seller.

5. The method of claim 1, wherein the item association data comprises a plurality of association rules.

6. The method of claim 5, wherein at least one of the association rules identifies a first set of items, X1, and a second set of items, X2, and specifies a conditional probability that a purchaser of X1 will also purchase X2.

7. The method of claim 5, wherein at least one of the association rules maps a two-item set to a single item.

8. The method of claim 1, wherein the item association data comprises data values reflective of how frequently specific items are purchased in combination.

9. The method of claim 1, further comprising automatically assigning the seller to said seller category based on electronic content provided by the seller.

10. A computer system configured to analyze the performance of sellers that sell items online, said computer system comprising one or more computers, said computer system programmed to implement:

an association mining engine that generates item association data based on transaction data of a plurality of sellers, said transaction data reflective of item sales transactions of the sellers, said item association data identifying items that are purchased in combination relatively frequently by buyers; and an analysis system that uses the item association data, in combination with transaction data of a seller, to perform an analysis of performance of the seller, and which generates, based on results of the analysis, recommendations of items for the seller to sell to improve performance.

11. The computer system of claim 10, wherein the analysis system uses the item association data in combination with the transaction data of the seller to detect disparities between expected and actual quantities of specific items sold by the seller.

12. The computer system of claim 11, wherein the analysis system uses the detected disparities to generate said recommendations.

13. The computer system of claim 10, wherein the association mining engine generates separate sets of item association data for each of a plurality of seller categories, and the analysis system uses each set of item association data to assess the performance of sellers falling in the respective seller category.

14. The computer system of claim 10, wherein the item association data comprises a plurality of association rules.

15. The computer system of claim 14, wherein at least one of the association rules identifies a first set of items, X1, and a second set of items, X2, and specifies a conditional probability that a purchaser of X1 will also purchase X2.

16. Non-transitory computer storage having stored thereon executable code that directs a computer system to perform a process that comprises:

storing transaction data of a plurality of sellers that sell items online in a seller category, said transaction data identifying specific items sold by the sellers to buyers;

generating, based on the transaction data of the plurality of sellers, item association data that identifies items that are purchased in combination relatively frequently by the buyers, said item association data not being specific to a particular seller;

analyzing performance of a particular seller by comparing the item association data to transaction data of the particular seller; and generating for the particular seller, based on results of the analysis of performance, a recommendation of at least one item for the seller to sell to improve performance.

17. The non-transitory computer storage of claim 16, wherein analyzing the performance of the particular seller comprises detecting disparities between expected and actual sales quantities of specific items.

18. The non-transitory computer storage of claim 16, wherein the process further comprises generating an electronic report that includes the recommendation, and transmitting the electronic report to the particular seller.

* * * * *